March 2, 1954  J. B. MINTER, 2ND  2,671,163
ILLUMINATED DIAL SCALE
Filed July 1, 1949
2 Sheets-Sheet 1
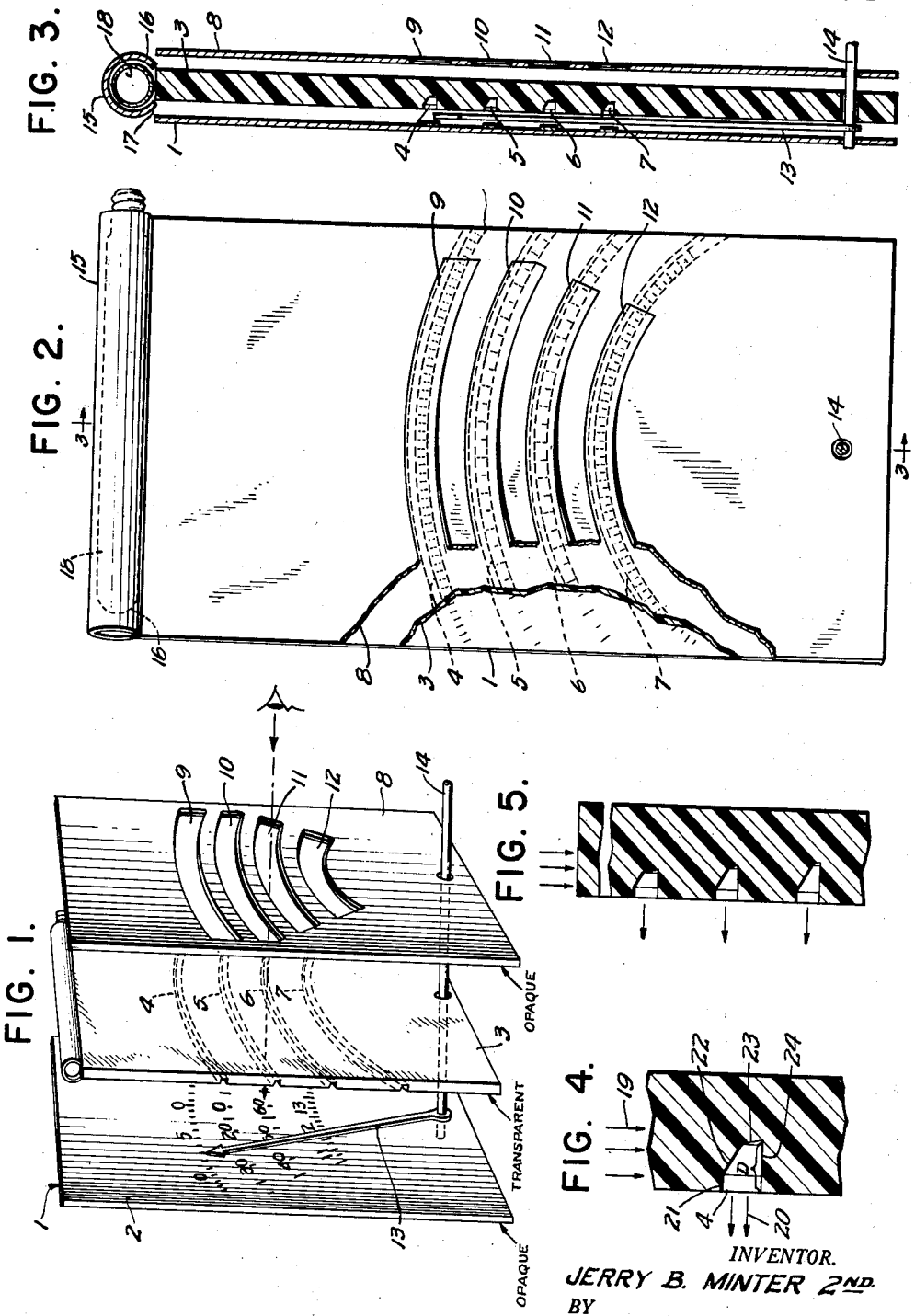
INVENTOR.
JERRY B. MINTER 2ND.
BY
John J. Rogan
ATTORNEY INVENTOR.
JERRY B. MINTER 2ND
BY John J. Rogan
ATTORNEY Patented Mar. 2, 1954

2,671,163

UNITED STATES PATENT OFFICE 2,671,163

ILLUMINATED DIAL SCALE

Jerry B. Minter 2nd, Boonton, N. J., assignor to Measurements Corporation, Boonton, N. J., a corporation of New Jersey Application July 1, 1949, Serial No. 102,479

4 Claims. (Cl. 240—2.1)

This invention relates to dials for indicating instruments generally, and more particularly it relates to dials of the locally-illuminated kind.

A principal object of the invention is to provide an improved indicator dial of the edge-illuminated kind.

Another object is to provide a locally-illuminated indicating dial or scale which has the calibration or graduation marks carried on an opaque backing, and a light-conductive transparent cover is provided for the backing, which cover is illuminated by a light source located adjacent one of its edges.

A feature of the invention relates to a locally-illuminated indicating dial or scale employing a surface upon which the scale markings or graduations can be easily applied as markings with ink or other suitable removable marking material, and the scale is provided with a cover of clear light-conducting plastic; the cover having at least one specially designed light-reflecting transverse element in registry with the scale markings, and arranged for local illumination by a lamp mounted adjacent an edge of the cover member.

Another feature relates to an improved dial for indicating instruments, comprising an opaque backing plate to which the scale markings can be applied in any convenient manner; in conjunction with a light-transmitting cover plate arranged to be illuminated by edge illumination; the said cover plate having at least one transverse groove in its surface in registry with the said scale markings, to produce efficient localized illumination thereof.

A further feature relates to an indicator dial or scale having a backing plate to which the scale markings or graduations are applied; a front opaque masking plate being provided for the backing plate, and having a transverse aperture in registry with said scale markings; and an intervening clear plastic sheet or light-conductive plate arranged to be illuminated by edge illumination, and having a specially designed light-reflecting groove in its flat surface in registry with the scale markings and with said aperture.

A still further feature relates to an improved indicator scale or dial having one or more series of scale markings, and having a novel illuminating and light-reflecting arrangement for confining the light substantially entirely to the regions of the scale markings. As a result of this feature, the scale is particularly well suited for use in aircraft or in other locations where subdued general lighting is desirable while maintaining a high efficiency of illumination of the scale markings.

Other features and advantages not particularly enumerated, will be apparent after a consideration of the following detailed descriptions and the appended claims.

In the drawing,

Fig. 1 is an exploded view showing the components of an illuminated dial assembly according to the invention.

Fig. 2 is a front view of Fig. 1 as seen from the right, with the parts of the elments broken away for clarity.

Fig. 3 is a sectional view of Fig. 2, taken along the line 3—3 thereof.

Fig. 4 is an enlarged sectional view of part of one of the elements of Fig. 1.

Fig. 5 is an enlarged sectional view of a modification of Fig. 4.

Figure 6:
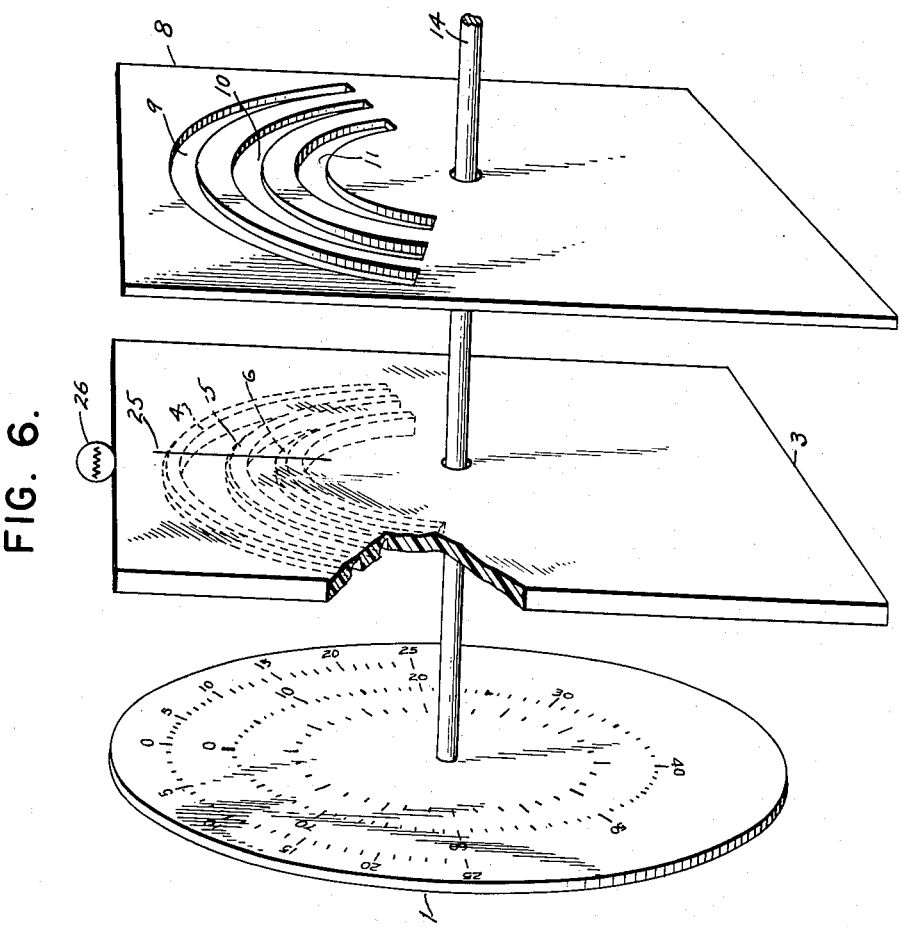
Fig. 6 is an exploded view of a modification of Fig. 1.

It has become quite common to illuminate the indicator dials of instruments and the like by employing a clear plastic plate adjacent one edge of which is located a suitable electric lamp. The scale markings or calibrations are usually engraved directly in the surface of the plastic plate, and in order to produce the necessary contrast, the engravings are filled with a black or opaque paint or the like. One of the main objections to this conventional type of indicator dial is that because of the well-known dimensional instability of plastic materials, it is not entirely feasible to produce the scale engravings therein with the utmost accuracy. This is particularly true in instruments requiring a very high order of readibility precision, since the variations in dimensions of the plastic prevent the scale markings from being applied with the same percentage of accuracy as regards different dials to which they are to be applied. Furthermore, since the scale markings are engraved in the body of the plastic itself, it is impracticable to make any corrections in the scale markings during or after the engraving.

The present invention has for one of its main objects, to overcome the disadvantages of that general kind of dial. Thus, referring to Fig. 1, there is shown a backing plate 1, which may be of metal or non-metallic material having the required degree of dimensional stability under different temperature, humidity, and other physical conditions. Preferably, the plate 1 is opaque, and has its surface 2 provided with a whitish coating to which the various calibration or scale markings or indicia can be applied with a suitable printing or marking ink. This results in a permanent, stable, and highly legible series of scale markings. While Fig. 1 shows a dial comprising four separate concentric series of scale markings, it will be understood that the invention is useful with a greater or less number of such concentric markings. In any event, since the scale markings are applied to the surface 2 with ink, they can be erased, and corrections made, at any time during the process of calibration in the event an error has been made. Located in front of the plate 1, is a plate 3 of clear light-transmitting material which is of clear plastic, or other similar light confining and conducting material. A typical example of such plastic is "Lucite" (methyl methacrylate resin) or "Plexiglas" (acrylate and methacrylate resin). A plastic is preferable for the plate 3, since it can be readily provided with a series of light-reflecting grooves 4, 5, 6, 7, which are concentrically spaced so as to be in registry with the corresponding scale markings on the surface 2. Mounted in spaced relation to the front side of plate 3 is an opaque masking plate 8, having a series of apertures 9, 10, 11, 12, in registry with the corresponding grooves 4, 5, 6, 7, on plate 1. Preferably the plates 1 and 3 are held in fixed spaced relation to accommodate a rotatable pointer or indicator arm 13 which is attached to a suitable spindle or shaft 14 which is operated by the control mechanism with which the dial is to be used. If desired, the masking plate 8 may be flat against the surface of plate 3 instead of being slightly spaced therefrom as shown in Fig. 3. Suitably mounted adjacent one edge, preferably the upper edge, of plate 3 is a tubular housing 15, having a longitudinal slit 16 conforming to the length and breadth of the upper edge 17 of plate 3. If desired, the internal surface of member 15 may be provided with a polished or light-reflecting coating. A suitable electric lamp 18 is telescoped into the member 15, and preferably this lamp is of the Lumiline or fluorescent type which is capable of producing a uniform light column along the length of the edge 17. If desired, the member 15 can be stapled, clipped, or otherwise anchored to the edge of plate 3 to form a unit therewith, and likewise the plates 1 and 3 can be stapled, clipped, or otherwise anchored in the proper spaced relation to the plate 3.

The rear surface of plastic plate 3 is provided with the concentric grooves 4, 5, 6, 7, as above described. I have found that by employing these grooves, the light from lamp 18 which is conducted through the body of plastic plate 3 as indicated by the arrows 19, can be individually reflected from each groove, as represented by the arrows 20 (Fig. 4). With this arrangement of grooves, the light is reflected on to the surface 2 substantially only in those regions corresponding to the respective scale markings. While the grooves can be of any desired cross-sectional shape to achieve this light reflection effect, preferably they are formed with a cross-section such as shown in Fig. 4, each groove comprising a flat wall portion 21, an inclined wall portion 22, another slightly inclined bottom wall portion 23, and a substantially uniform flat wall 24. It will be understood, of course, that the invention is not limited to this particular cross-sectional shape of the groove, so long as the groove is cut to cause the light rays to be reflected outwardly through the groove opening and on to the respective scale markings. In general, however, the amount of light which is reflected is a function of the depth D of each groove.

In indicator devices having more than one scale, in order to achieve the utmost degree of light uniformity on the respective scale markings, it is advisable to have the grooves of different depths. For example as shown in Fig. 5, the grooves nearest the light source 18 are of shallower depth than the grooves further away from the said light source, in order to compensate for the increased distance of the respective grooves from the said light source. However, for ordinary uses, it is not necessary to cut these grooves with different depths, since the difference in illumination of the respective scale markings may not be sufficient to warrant the extra cost involved in cutting the grooves to different depths. However in certain uses, for example on aircraft dials, where the general illumination is of critical importance, it is advisable to cut the grooves to different depths to reduce the amount of eye fatigue required to view the various instruments.

It will be understood, of course, that the plates 1, 3 and 8 are held in the appropriate fixed relation, so as to maintain the scale markings and their respective grooves 4, 5, 6, 7, and the respective apertures 9, 10, 11, 12, in fixed registry. It will also be understood that the invention is not necessarily limited to a scale assembly using the apertured plate 8. Thus the dial assembly may be comprised solely of the plates 1 and 3. However in that case, if desired, the front surface of plate 3 can be blackened except at the regions corresponding with the grooves 4, 5, 6, 7, thus eliminating the necessity for using a separate apertured masking plate 8.

While certain particular embodiments have been described herein, it will be understood that various changes and modifications may be made therein without departing from the spirit and scope of the invention.

Instead of having the plate 1 stationary and moving the pointer 13, it will be understood that the reverse arrangement may be used. Thus as shown in Fig. 6, the plate 1 is in the form of a circular metal disc carrying the several scale indicia. This disc is attached to the shaft 14 for rotation thereby. Mounted in front of the disc 1 is the transparent plate 3 having the respective scale grooves 4–6 as above described. Engraved on the ungrooved face of plate 3 is fine black reference line 25. The plate 3 is illuminated at its edge by an electric lamp bulb 26 which may be similar to bulb 18, or it may be any conventional dial light. The slotted aperture mask 8 is mounted in front of the plate 3. The action of the grooves 4–6 in conjunction with the edge illumination illuminates the respective scale markings in the manner described above in connection with Fig. 1.

What is claimed is:

1. An indicator dial, comprising a backing member carrying indicia to be viewed, a plate of material which is light-conducting mounted adjacent said backing member, a source of light adjacent the edge of said plate, said plate having means defining a groove on its surface in registry with said indicia and with the concave side of the groove opening facing said indicia, said groove having one side wall inclined to the face of said plate to refract the incident light rays into the groove and the opposite side wall being substantially at a right angle to the face of said plate to reflect the refracted rays outwardly through said groove opening on to said indicia.

2. An indicator dial, comprising a backing plate carrying indicia to be viewed, a plate of substantially transparent material which is light conducting mounted parallel to said backing plate, means defining a groove on the side of said transparent plate with the concave side of the groove opening facing said backing plate, a source of light mounted adjacent an edge of said transparent plate, said groove having its cross-section cut to direct the light from said source after being conducted through said transparent plate and thence outwardly through the concave side of the groove opening on to said backing plate and substantially only in the region in registry with said indicia, said transparent plate being of substantially clear plastic and said groove being cut with a cross-section having one side wall extending at an inclined angle to the transverse thickness of the plate and to the direction of the light rays conducted through the plate from said source and the opposite side wall being substantially parallel to the said thickness.

3. An indicator dial, comprising a backing plate carrying indicia to be viewed, a plate of substantially transparent material which is light conducting mounted parallel to said backing plate, means defining a groove on the side of said transparent plate with the concave side of the groove opening facing said backing plate, a source of light mounted adjacent an edge of said transparent plate, said groove having its cross-section cut to direct the light from said source after being conducted through said transparent plate outwardly through the concave side of the groove opening on to said backing plate and substantially only in the region in registry with said indicia, said transparent plate being of clear plastic and said groove being cut with a cross-section having one side wall inclined to the face of said plate and the opposite side wall substantially perpendicular to the face of the plate to act as a reflector for the light rays refracted through said inclined wall into said groove, and cooperating with said inclined wall to reflect the light outwardly through the groove opening.

4. An illumination control element for dials and the like, comprising a plate of light-conducting material having at least one groove cut in its surface, said groove having a wall portion inclined with respect to the thickness of the plate and another wall portion substantially parallel to the thickness of the plate whereby light rays conducted through the plate from the edge thereof are refracted into the groove and are reflected outwardly through the concave side of the groove opening on to the surface to be illuminated.

JERRY B. MINTER 2ND.

References Cited in the file of this patent

UNITED STATES PATENTS

| Number | Name | Date |
|---|---|---|
| 1,664,302 | Leopold et al. | Mar. 27, 1928 |
| 1,757,493 | Wharam | May 6, 1930 |
| 1,942,343 | Minassiantz | Jan. 2, 1934 |
| 1,950,548 | Fuller, Jr. | Mar. 13, 1934 |
| 2,009,209 | Scantlebury | July 23, 1935 |
| 2,128,246 | Hardesty | Aug. 30, 1938 |
| 2,214,595 | Rights | Sept. 10, 1940 |
| 2,566,026 | Hughes, Jr. | Aug. 28, 1951 |

OTHER REFERENCES

Ser. No. 375,429, Weber (A. P. C.), published May 25, 1943.

Piping Light with Acrylic Materials, Reprinted from August 1946 issue of Modern Plastics. (Copy available in Div. 67.)